Figure 1:
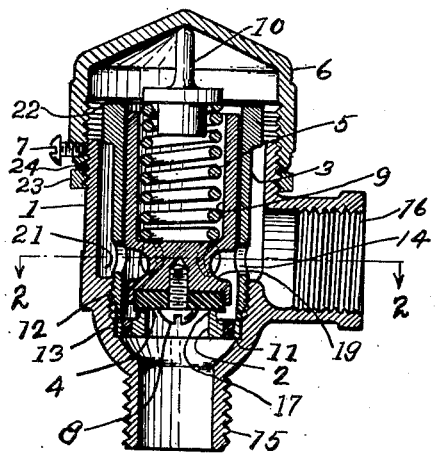

Dec. 17, 1929.　　　　W. J. SNOW　　　　1,740,422
RELIEF VALVE
Filed April 21, 1928

Inventor
Wallace J. Snow
By Edmund J. DePas
Attorney

Patented Dec. 17, 1929

1,740,422

UNITED STATES PATENT OFFICE

WALLACE J. SNOW, OF LAKEWOOD, OHIO, ASSIGNOR TO THE CLEVELAND HEATER COMPANY, OF CLEVELAND, OHIO, A CORPORATION OF OHIO

RELIEF VALVE

Application filed April 21, 1928. Serial No. 271,867.

This invention relates to improvements in relief valves, and more particularly to adjustable relief valves that are adapted to be regulated to meet varying pressures through the medium of suitable adjustable control mechanism and constitutes an improvement of the relief valve disclosed by Arthur Friedman in his patent application Serial No. 64,483 filed by him October 24, 1925.

Relief valves have heretofore been proposed wherein excessive pressures lifted a spring pressed valve head. Such relief valves are often rendered inopeartive through the cementing together of the valve parts resulting from corrosion or other deteriorating influences that prevent the proper operation of such valves when abnormal pressures develop in the system with which such valves are used.

The use of a frangible diaphragm that ruptures when subjected to certain pressures has also been proposed as a means of safeguarding systems subjected at times to abnormal pressure. Replacement of the diaphragms in such relief mechanism is required whenever the mechanism operates to relieve the system and, therefore, temporary abnormal conditions are either not relieved or their relief requires frequent replacement of the ruptured diaphragms.

The improved valve herein described, which is particularly designed and adapted for use as a relief valve in connection with automatic storage water heating systems, such as domestic hot water systems and the like, is of simple and inexpensive structure, embodying an adjustable spring controlled valve head that is normally adapted to afford relief for predetermined pressures. This valve structure also embodies a valve seat that ruptures when subjected to pre-determined pressures and that also includes fusible portions that afford relief for the system when predetermined excessive temperatures are reached.

Such an arrangement of valve parts provides a mechanical spring controlled relief for all temporary abnormal pressures and also insures operation of the relief valve under all abnormal dangerous conditions, such as dangerous pressures or temperatures, existing in the system with which the valve is used. The relief of the system through the rupture of the valve seat from either excessive pressure or excessive temperature is independent of the operation of the adjustable spring pressed valve head which might become inoperative through corrosion or disarrangement of the valve parts.

One object of the invention is to provide a generally improved relief valve of the type indicated, which will be exceedingly simple in operation, and wherein the liability to breakage or disarrangement of the parts is reduced to a minimum.

Another object of the invention is to provide a valve structure wherein the valve seat may be readily replaced by removal of the valve cage.

A further object of the invention is to provide a valve structure wherein the seating face of the valve head may be readily renewed upon removal of the valve head.

A further object of the invention is to provide a valve structure wherein the valve housing requires a minimum number of machining operations that are of such character that they may be performed at great speed by relatively inexperienced operators.

An additional object of my invention is to provide a relief valve that is normally responsive to abnormal pressures and that embodies a supplemental, independently operating means adapted to positively give relief when either dangerous pressures or dangerous temperatures develop in the system with which the valve is used.

A further and important object is the provision of an improved frangible and fusible valve seat, together with improved means for mounting and securing the seat in the valve housing.

With the above mentioned and other objects in view, the invention consists in the novel construction, arrangement and combination of parts, hereinafter described, illustrated in some of its embodiments in the accompanying drawings, and particularly pointed out in the appended claims.

Figure 2:
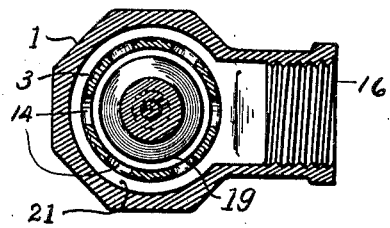
Figure 3:
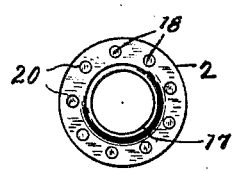

Referring to the drawings, forming a part of this specification, Fig. 1, is a side elevational view in section of a relief valve constructed in accordance with this invention. Fig. 2, is a section taken on line 2—2, Fig. 1. Fig. 3, is a plan view of the removable valve seat used in my improved relief valve.

The type of relief valve shown in Fig. 1, Fig. 2 and Fig. 3, as illustrative of my invention, comprises a valve casing 1 having a valve seat 2 removably secured therein by a valve cage 3. A removable and replaceable washer 4 of a relatively yielding material such as hard rubber composition or fiber, is held in yielding engagement with the raised valve seat 17 by a spring 5, the pressure of which may be adjusted by turning the screw threaded cap 6 that is mounted on the valve casing. Leakage past the cap 6 is prevented by means of the rubber or fibre gasket 24 and the internally threaded annular collar 23 that is threadably received by the valve casing.

The annular raised valve seat 17 is integrally formed on the apertured annular temperature responsive removable disk 2. The disk 2 is made of brass or any other suitable material and is provided with a series of openings or holes 20 circumferentially arranged about the raised valve seat 17.

The openings 20 are filled with a substance that is relatively frangible and fusible as compared with the rest of the valve structure. A suitable material for this purpose would be an alloy of lead and bismuth which would fuse at a much lower temperature than the rest of the valve, and which would also rupture at pressures that the rest of the valve could safely withstand. The fusible and frangible inserts 18 thus provide by way of the openings 20 independent pressure responsive relief means and independent temperature responsive relief means both of which are independent of the operation of the fluid pressure responsive valve head.

The screw threaded cap 6 is locked in the desired position by means of the set screw 7. The replaceable washer 4 is secured, by means of a screw 8, to the valve head 19 which provides an abutment for the valve spring 5 and a seat for the mounting of the washer 4. A spring abutment 10 is positioned between the cap 6 and the spring 5 and it cooperates with the screw threaded cap 6 in the adjustment of the tension of the valve spring 5.

The valve casing is so designed that a minimum of machine work is required to finish its interior. The removable temperature and pressure responsive disk 2 is adapted to be securely seated by the valve cage 3 on an annular shoulder 11 that is formed in the casing. A threaded portion 12 of the casing engages the correspondingly threaded lower end of the valve cage 3. The valve casing 1 also has a cylindrical machined portion 13 that terminates in the annular shoulder 11 and serves as a guide and centering device for the disk 2.

The portion of the valve casing adjacent the screw threaded portion 12 is somewhat enlarged as at 21 to provide sufficient space around the valve cage to permit a sufficient area for the escape of the released fluids upon rupture or fusion of the valve seat, or upon relieving of the valve head.

The valve head 19 is provided with an upstanding centrally bored cylindrical extension 9 that cooperates with the inner cylindrical surface of the valve cage 3 and serves as a guide for the valve head 19. The valve cage 3 is provided with a series of radially spaced openings 14, located a short distance above the valve head, for the escape of fluid upon relieving of the valve. The valve body is provided with an externally threaded extension 15 by means of which it is adapted to be mounted on the appliance with which it is used. An internally threaded opening 16 which is provided for connection with a suitable conduit to carry off liquids discharged from the valve when in its open position.

From the fore-going it will be apparent that when the valve is in position for use on an appliance, such as a gas fired domestic water heater, the screw threaded cap 6 will be adjusted so that the valve will open when a dangerous pressure is reached preventing bursting of the water heater tank and the damage that might result therefrom. Should the water become over-heated through any cause whatever the fusible inserts 18 will melt and relief will be provided by way of the openings 20. As the above inserts are made from a relatively weak or frangible material, as compared with the rest of the valve structure, excessive pressures at ordinary temperatures would blow out these elements in case the valve head failed to open.

In the event of fusion or rupture of the inserts 18 the disk 2 may be readily removed and replaced by unscrewing cap 6, removing the abutment 10, the spring 5 and the valve head 19 and then unscrewing the valve cage 3 which is provided with a hexagonal head 22 for engagement with an ordinary monkey wrench. When the cage 3 is removed, the disk 2 may be readily removed and a new one put in its place and the afore-mentioned parts reassembled. This operation takes but a few minutes due to the small number of parts in my valve and because the only tool required is an ordinary monkey wrench.

From the above description of the elements of the relief valve herein proposed, it will be seen that the elements of the valve structure may be inexpensively manufactured. None of the parts are of complicated form and a minimum of machining is required. The valve structure may be assembled by a relatively inexperienced and inexpensive type of labor.

The valve casing has the threaded portions that are necessary to secure the relief valve to the system with which it is intended to operate. The valve receiving portion of the casing has the internally threaded portion that is adapted to receive the valve cage, a shoulder for the valve seat, and a guide face for the valve seat. All of these machined portions of the interior of the valve cage in general are so arranged that they may be finished with a minimum of expense.

The assembly of the structure is very simple, the valve seat disk 2 is dropped in place and rigidly secured on the shoulder 11 by inserting and tightening the valve cage 3. This assembly also permits very ready removal and replacement of an injured valve seat and, since the seating face 17 of the valve seat disk is the only element of the valve structure that requires careful machining, all portions of the valve casing may be roughly machined so as they provide a fluid-tight mounting for the disk 2. Sufficient adjustment or give is provided by the yielding contacting washer 4 of the valve head to enable it to properly seat upon the valve seat if for any reason the valve seat is slightly eccentric or otherwise unsymmetrically positioned within the valve casing. The washer 4 provides a simple and inexpensive means to insure at all times a fluid-tight valve and it may, if damaged, be readily replaced by removing the set screw 8.

My simplified form of relief valve is particularly intended for use in connection with systems wherein an inexpensive relief valve of this character is desired and wherein it is not necessary to incorporate means for periodically testing the relief valve by lifting the valve head from its seat during the operation of the system. The assembly of this valve is of such character that any of the operating elements may readily be removed for inspection, repair or replacement without disturbing the connections of the relief valve with the system.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A relief valve structure comprising a cast metal valve casing having an annular shoulder and a screw threaded portion adjoining the shoulder, an annular valve seat adapted to be removably received on said shoulder and having an inner annular raised seating portion, a valve cage of cylindrical form having a wrench engaging portion at one end and a screw threaded portion at the other end adapted to engage the correspondingly threaded portion of said casing to removably clamp said valve seat on said annular shoulder the screw threaded portion of said valve cage being disposed at the end thereof that is adapted to clamp the valve seat in place, a valve head having an upstanding cylindrical portion integrally formed thereon and cooperatively received in said valve cage, a valve cap carried solely by said valve casing, and valve gear disposed substantially within said valve cage and engaging said valve cap to exert yielding seating pressure on said valve head.

2. A relief valve structure comprising a cast metal valve casing having an annular shoulder and a screw threaded portion adjoining the shoulder formed therein, an annular valve seat having an inner raised seating portion adapted to be removably mounted on said shoulder, a valve cage of cylindrical form having a screw threaded portion adapted to engage the correspondingly threaded portion of said casing to removably clamp said valve seat on said annular shoulder the screw threaded portion of said cage being disposed at the end thereof that is adapted to clamp the valve seat in place and the end of said valve cage remote from said threaded portion being adapted to extend beyond the side walls of said casing for the convenient removal of said valve cage, a valve head cooperatively received in said valve casing and guided thereby, valve gear disposed partially within said valve head and adapted to exert yielding seating pressure on said valve head, and a valve cap carried solely by the casing adapted to enclose said valve cage.

3. A relief valve structure comprising a cast metal valve casing having an annular shoulder and a screw threaded portion formed therein immediately adjoining said shoulder, an annular disk having an annular raised portion forming a valve seat adapted to be removably mounted on said shoulder, a valve cage of cylindrical form having a screw threaded portion at one end thereof adapted to engage the correspondingly threaded portion of said casing to removably clamp said annular disk on said annular shoulder a portion of said valve cage on the end thereof opposite the threaded end extending beyond the side walls of said casing for the convenient removal of said valve cage, a valve head provided with guiding means cooperating with said valve cage, valve gear disposed partially within said valve head and adapted to exert yielding seating pressure on said valve head, and a valve cap adapted to enclose said valve cage, and constituting means for adjusting the yielding pressure exerted by said valve gear on said valve head.

4. A relief valve structure for water heating systems comprising a valve casing having inlet and outlet passages, a pressure responsive valve head interposed between said passages, a removable and replaceable washer mounted on said valve head to provide a seating face therefore, a supplemental pressure responsive relatively friable and fusible element rigidly and removably secured between said passages said pressure responsive element being adapted to be subjected to the pressure of the system with which said valve is used and to rupture when the pressure or temperature within the system exceeds a predetermined value to thereby connect said inlet and outlet passages independently of the operation of said valve head.

5. A relief valve comprising a valve casing provided with inlet and outlet passages, a rigidly and removably mounted disk having temperature responsive inserts and a raised seating portion said temperature responsive inserts being primarily adapted to respond to predetermined fluid temperatures independently of the remainder of the valve structure, means for rigidly and removably securing the valve seat in the valve casing, a valve head seated on said valve seat, guiding means integrally formed on said valve head, a spring normally acting on the valve head to close the valve, and a valve cap forming an abutment for said spring.

6. A relief valve structure comprising a valve casing, a valve cage adapted to be received in said valve casing, a temperature responsive valve seat adapted to be removably and rigidly secured within the valve casing by said valve cage having a portion formed from a relatively fusible material, a combined valve head and guide member, a valve spring in contact with said valve head, a valve cap to provide means for adjusting the tension of said valve spring, and means to prevent fluid leakage past said valve cap when said valve is in open position.

In testimony whereof I affix my signature.

WALLACE J. SNOW.